US 8,600,983 B2

(12) United States Patent
Frank et al.

(10) Patent No.: US 8,600,983 B2
(45) Date of Patent: *Dec. 3, 2013

(54) GROUP SWARM METRICS AND CONTENT

(71) Applicant: AT&T Intellectual Property I, L.P., Atlanta, GA (US)

(72) Inventors: Scott M. Frank, Dunwoody, GA (US); Steven Neil Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,504

(22) Filed: Nov. 29, 2012

(65) Prior Publication Data
US 2013/0086192 A1  Apr. 4, 2013

Related U.S. Application Data

(63) Continuation of application No. 11/609,685, filed on Dec. 12, 2006, now Pat. No. 8,359,310.

(51) Int. Cl.
*G06F 17/30* (2006.01)
(52) U.S. Cl.
USPC .......................................................... 707/724

(58) Field of Classification Search
USPC .......... 707/705, 709, 724, 727, 748, 751, 788
See application file for complete search history.

(56) References Cited

U.S. PATENT DOCUMENTS

| 5,754,938 | A | * | 5/1998 | Herz et al. | 725/116 |
| 6,047,327 | A | * | 4/2000 | Tso et al. | 709/232 |
| 6,651,098 | B1 | * | 11/2003 | Carroll et al. | 709/224 |
| 6,807,558 | B1 | * | 10/2004 | Hassett et al. | 709/203 |
| 7,483,871 | B2 | * | 1/2009 | Herz | 1/1 |
| 8,359,310 | B1 | | 1/2013 | Frank et al. | |
| 2006/0008256 | A1 | * | 1/2006 | Khedouri et al. | 386/124 |
| 2006/0235885 | A1 | * | 10/2006 | Steele et al. | 707/104.1 |
| 2007/0078884 | A1 | * | 4/2007 | Ott et al. | 707/102 |
| 2007/0220048 | A1 | * | 9/2007 | Ott, IV | 707/104.1 |

* cited by examiner

*Primary Examiner* — Jorge A Casanova

(57) ABSTRACT

Methods for providing group swarm metrics and content are described herein. In different aspects, the methods may include compiling a content access metric. The methods may also include determining a threshold metric for a user. Further, the methods may include generating a notification message for the user when the compiled content access metric reaches the threshold metric. The methods may additionally include delivering the notification message to the user. The techniques described herein may enable the user to retrieve the content.

19 Claims, 7 Drawing Sheets

GROUP SWARM METRICS AND CONTENT

This application is a continuation of U.S. patent application Ser. No. 11/609,685, filed Dec. 12, 2006, which is currently allowed and is herein incorporated by reference in its entirety.

FIELD OF THE DISCLOSURE

The present disclosure relates to methods of communication, and more specifically to methods for providing group swarm metrics and content.

BACKGROUND

Generally speaking, many people desire to be kept abreast of current trends in society. For example, when watching the news, a person may like to be informed of current societal events and trends, popular products, and interesting programming of which they have access to consume. However, often such information is difficult to find or navigate through, thus motivating a person to seek out desired specific information. Further, once the information is retrieved, the information is often out of date, or less desirable than if it was obtained when it was created or when the event or programming had originally occurred. For example, when a television event occurs which attracts a very large number of viewers, such that it may top a most popular list, a person may want to become aware of the event before the event ends, enabling the person to view the event as it is occurring as opposed to hearing about the television event after the fact or viewing it at a later point in time.

Currently, some mediums permit a person to discover and select content that is the most popular for a particular information source. For example, many online newspapers now publish the "most emailed articles" in ascending order to permit readers to view articles that others are frequently reading. However, to obtain this information, a person must first seek out a website in order to view its most emailed articles list. Further, not all websites contain such information, resulting in wasted time and energy by a person searching for this information. Some services determine the audience size of a particular viewing event such as Nielsen Media Research of New York City, N.Y. However, this information is disadvantageous because it is not provided in a real-time environment and is often compiled into generic categories that do not appeal to the specific interests of individual people.

The description below addresses these and other shortcomings in the present art.

SUMMARY

Methods for providing group swarm metrics and content are described herein. In different aspects, the methods may include compiling a content access metric. The methods may also include determining a threshold metric for a user. Further, the methods may include generating a notification message for the user when the compiled content access metric reaches the threshold metric. The methods may additionally include delivering the notification message to the user. The techniques described herein may enable the user to retrieve the content.

Additional methods for providing group swarm metrics and content are described herein. In some embodiments, the methods may include creating content access information. The methods may also include sending the content access information to a second component. Further, the methods may include receiving a content notification by the second component when a threshold value is met for a user. The methods may also include displaying the content notification message to the user. The techniques described herein may enable the user to retrieve the content included in the content notification.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures.

DETAILED DESCRIPTION

Figure 1:
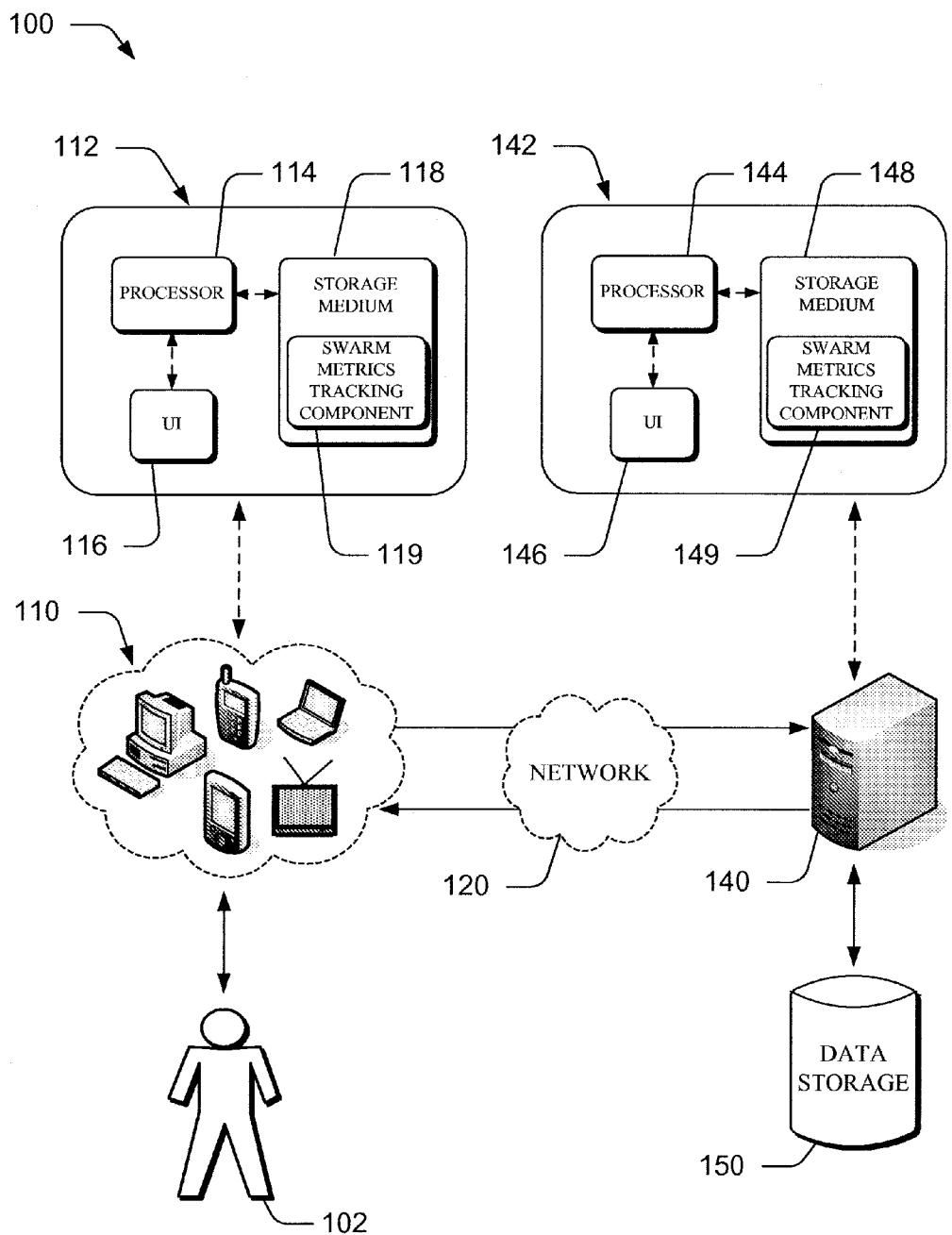
FIG. 1 is a block diagram of an overall environment in which computing devices interact between a user and a server and how a communication system may be organized.

FIG. 1 illustrates an overall environment 100 in which a computing device 110 interacts between a user 102 and a server 140. The user 102 may interact with the computing device 110 connected to a network 120. The computing device 110 may be a desktop, mobile, handheld, or laptop computer, a mobile telephone, a personal digital assistant (PDA), a digital video recorder (DVR), multi-function device, or any other suitable computer-based device. In addition, the user 102 may interact directly with the computing device 110, or the user 102 may access the computing device 110 over a local or wide area network (not shown in FIG. 1). FIG. 1 shows one user 102 for convenience only, but it is noted that the environment 100 may support any number of users 102, each with one or more computing devices 110.

The computing device 110 may include a number of components 112. These components 112 may include one or more processors 114 that are coupled to instances of a user interface (UI) 116. The UI 116 represents any devices and related drivers that enable the computing device 110 to receive input from the user 102, and to provide output to the user 102. Thus, to receive input from the user 102, the UI 116 may include keyboards or keypads, mouse devices, touch screens, microphones, speech recognition packages, or the like. To provide output to the user 102, the UI 116 may include speakers, display screens, printing mechanisms, or the like.

The computing device 110 may include one or more instances of a computer-readable storage medium 118 that are addressable by the processor 114. As such, the processor 114 may read data or executable instructions from, or store data to, the storage medium 118. The storage medium 118 may contain a swarm metrics tracking component 119, which may be implemented as one or more software modules that, when loaded into the processor 114 and executed, cause the computing device 110 to perform any of the functions described herein. Additionally, the storage medium 118 may contain implementations of any of the various software modules described herein.

The server 140 is also in communication with the user 102 through the network 120. The server 140 may include a number of components 142. The server may include one or more processors 144 that are coupled to instances of a user interface (UI) 146. The UI 146 represents any devices and related drivers that enable the server 140 to receive input from the user 102, and to provide output to the user 102. The server 140 may include one or more instances of a computer-readable storage medium 148 that are addressable by the processor 144. As such, the processor 144 may read data or executable instructions from, or store data to, the storage medium 148. The storage medium 148 may contain a swarm metrics tracking component 149, which may be implemented as one or more software modules that, when loaded into the processor 144 and executed, cause the server 140 to perform any of the functions described herein. Additionally, the storage medium 148 may contain implementations of any of the various software modules described herein.

The server 140 may communicate with one or more data storage devices 150 accessible over the network 120, which may be a local or wide area network. For example, the data storage 150 may be associated with an Internet website, whereas the user 102 that accesses the Internet website through the server 140 using the computing device 110 will have the user's 102 access information stored by the data storage device 150. In another example, the data storage device 150 may be associated with the computing device 110. In this example, the data storage device 150 may track the computing device's activities, or alternatively, a portion of the computing device's activities, such that the data may be utilized at a later point, such as by querying the stored data to provide informational message distribution to subscribers. While FIG. 1 shows one data storage device 150 for convenience, the environment 100 may support any number of data storage devices.

The computing device 110 may process input received from the user 102. Some or all of the input from the user 102 may be transmitted through the network 120 to the server 140 and stored on the data storage device 150. Further, information stored on the data storage device 150 may be transmitted back to the computing device 110.

With continued reference to FIG. 1, the environment 100 may enable stigmergic communication to facilitate peer communication. In such embodiments, the environment 100 may function to detect, monitor, aggregate, and share metrics collected stigmergically, as they occur in the environment. For example, when a user accesses a particular piece of content, other users may become aware of this access of content through the environment 100, and thus may react to this information flow between users which is transmitted through the environment 100 to further expand the trail of shared information.

Figure 2:
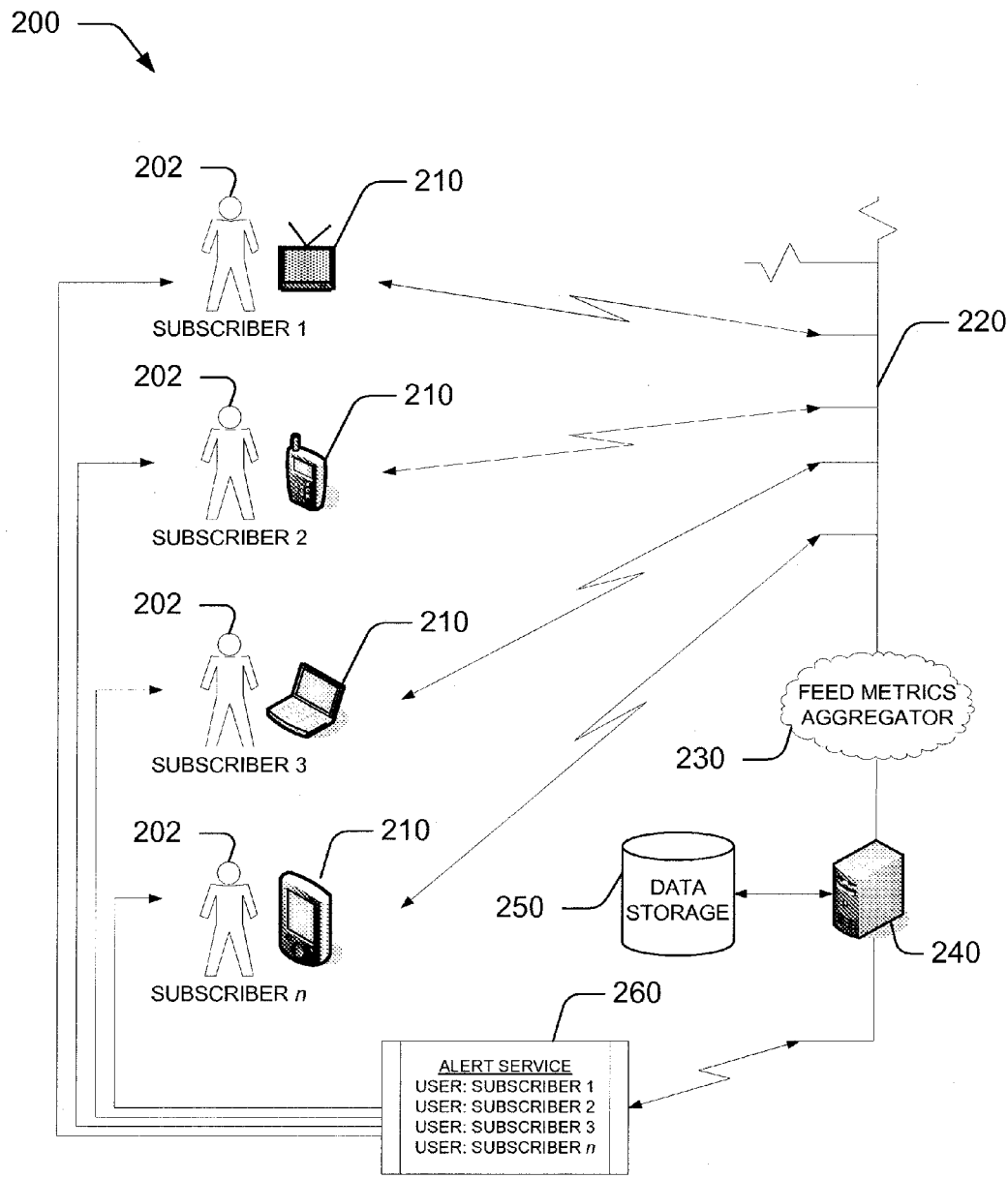
FIG. 2 is a block diagram providing further details of the overall environment shown in FIG. 1, relating to various subscribers and computing devices connected through a network and how a network may be organized.

Having presented the above overview of the environment 100, the discussion now turns to a description of further details of the overall environment, now presented with FIG. 2.

FIG. 2 illustrates an overall environment 200 relating to various users 202 and computing devices 210 connected to a network 220. The environment 200 includes any number of users 202 (e.g., subscribers 1 to n). Each user 202 is connected to a network 220 utilizing the computing device 210. The connection to the network 220 may be through wireline environments such as cable communications and power line communications; wireless environments such as cellular, PCS, WiFi, Wimax, Ultrawideband, Bluetooth, satellite transmission, and the like; nontraditional networks such as packet-based networks and network elements, such as Internet Protocol networks and elements; or by other operable means providing network connection.

According to exemplary embodiments, a feed metrics aggregator 230 is operatively connected to the computing devices 210 through the network 220. The feed metrics aggregator 230 may facilitate data compilation and manipulation from the computing devices 210 connected on the network 220. For example, the feed metrics aggregator 230 may transmit the network connectivity status, time, geographic location, user information, data description, and other relevant information for each data request through the network 220 by the computing device 210. Additionally, the feed metrics aggregator 230 may manipulate data received from the computing devices 210 such as to calculate the net access time for each data link by the computing device 210, or other calculations utilizing information accessed by the computing devices 210.

A server 240 and a data storage device 250 are further connected through the network 220 to the feed metrics aggregator 230, and in turn to the computing devices 210. The feed metrics aggregator 230 may transmit data to the server 240 and the data storage device 250. For example, data from a computing device may be manipulated by the fee metrics aggregator 230, processed by the server 240, and then transmitted to the data storage device 250 for subsequent retrieval. At a later point, the server 240 may retrieve data on the data storage device 250, and then transmit the data, or portions of data to an alert service 260.

The message alert service 260 is operatively connected to the server 240 through the network 220. The alert service 260 contains information for each user 102 (subscriber 1 to n) in the environment 200. For example, the message alert service 260 may contain a message for subscriber 1 that a threshold value has been met for a particular website while the message alert service 260 may contain a message for subscriber 2 that a threshold value has been met for a particular video source such as a network television program. The message alert service 260 delivers messages to the users 202 through the computing devices 210. In one example, first user 202 may access content on a mobile phone such as a music video. A second user 202 may then receive a message from the message alert service 260 notifying the second user 202 that the first user has accessed the content. However, this example assumes that any threshold values and filters (further described below) have been satisfied to permit delivery of the message to the second user.

In other embodiments of the environment 200, some or all of the users 202 and computing devices 210 may be connected in a local proximity cloud (not shown). For example, one or more users 202 may be connected to other users directly through Bluetooth, Wimax, or other device-to-device connectivity means that do not require an intermediate server. The local proximity cloud may include a plurality of users 202 confined to a relatively small geographic location thus enabling device-to-device connectivity; however no specific geographic location may be necessary for some types of connectivity means which do not include local geographic constraints. The proximity group may receive communications which are asynchronous in nature and processed by the individual computing devices 210, or processed by a combination of computing devices capable of exchanging information. Further, a proximity cloud and a network environment may co-exist to enable a user outside of a network to retrieve or monitor information from within the network. For example, a first user may connect to a second user, the second user having access to secure network of which the first user does not directly have access. The first user can then retrieve information through the second user regarding the activities on the second user's secure network.

Figure 3:
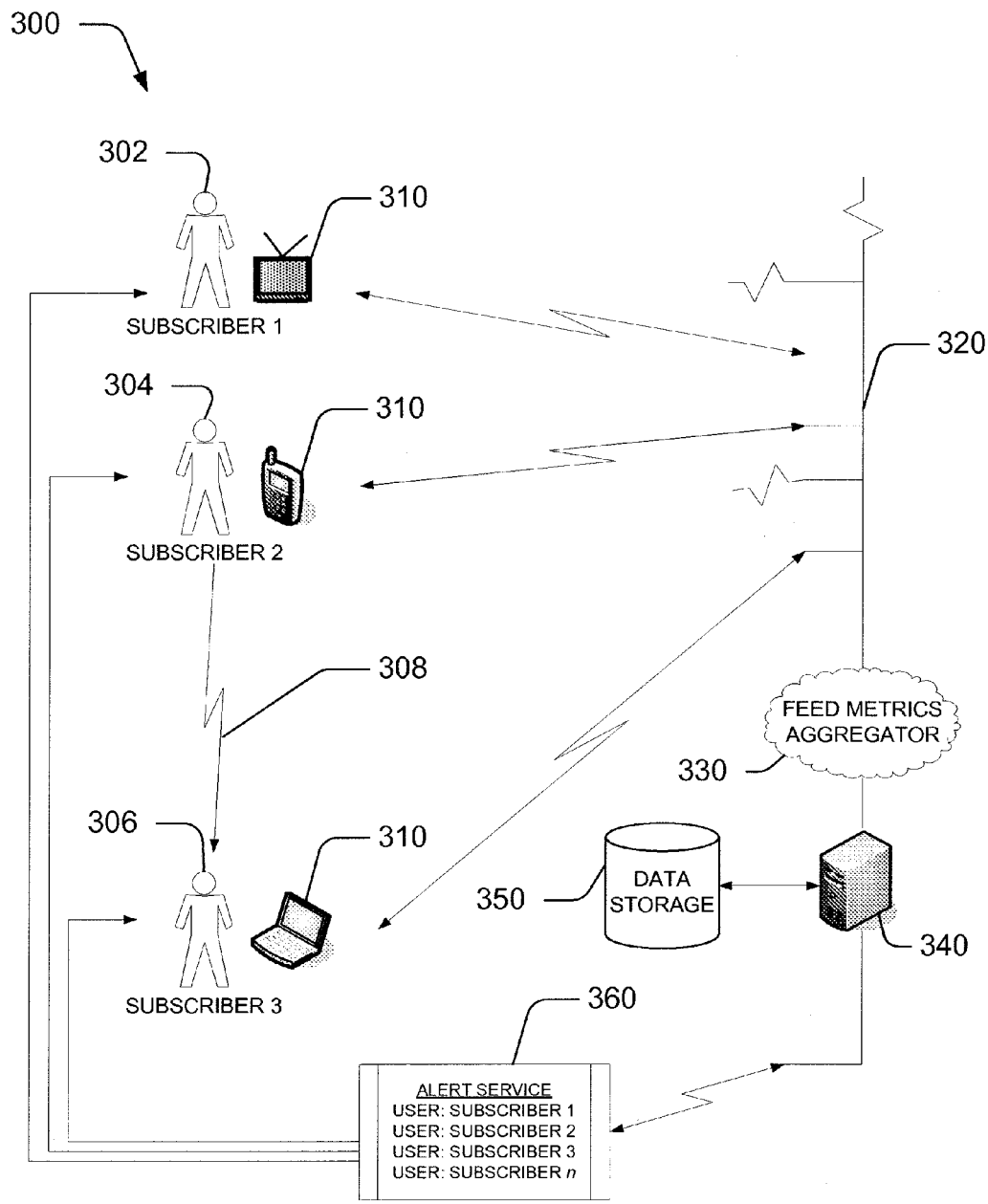
FIG. 3 is a block diagram providing further details of another configuration of the overall environment shown in FIG. 1, relating to network connectivity between subscribers and how a network may be organized.

FIG. 3 illustrates an additional configuration of the environment depicted in FIG. 2. In the environment 300 in FIG. 3, a first user 302 may access content. A second user 304 may then be notified of the content access from a message alert service 360. The second user 304 may then send the content notification to a third user 306 based on the message received by the second user 304 originating from the message alert service 360. As described previously, the message alert service 360 may interact through a network 320 with a server 340, data storage device 350, and feed metrics aggregator 330 to provide the content notification.

In an example, the second user 304 may receive a message notifying the second user that the threshold value has been achieved for an Internet website uniform resource locator (URL). Next, the second user 304 may choose to share the received information, including at least some of the message content such as the content link, to a third user 306 via a message 308. The shared message 308 may include the same information received from by the second user 304, or it may contain more or less information than that received by the second user 304 such as by including a personal message, removing content, or the like. The third user 306 may then access the content through the message 308 from the second user 304 to view the content directly on the third user's 306 computing device 310.

Figure 4:
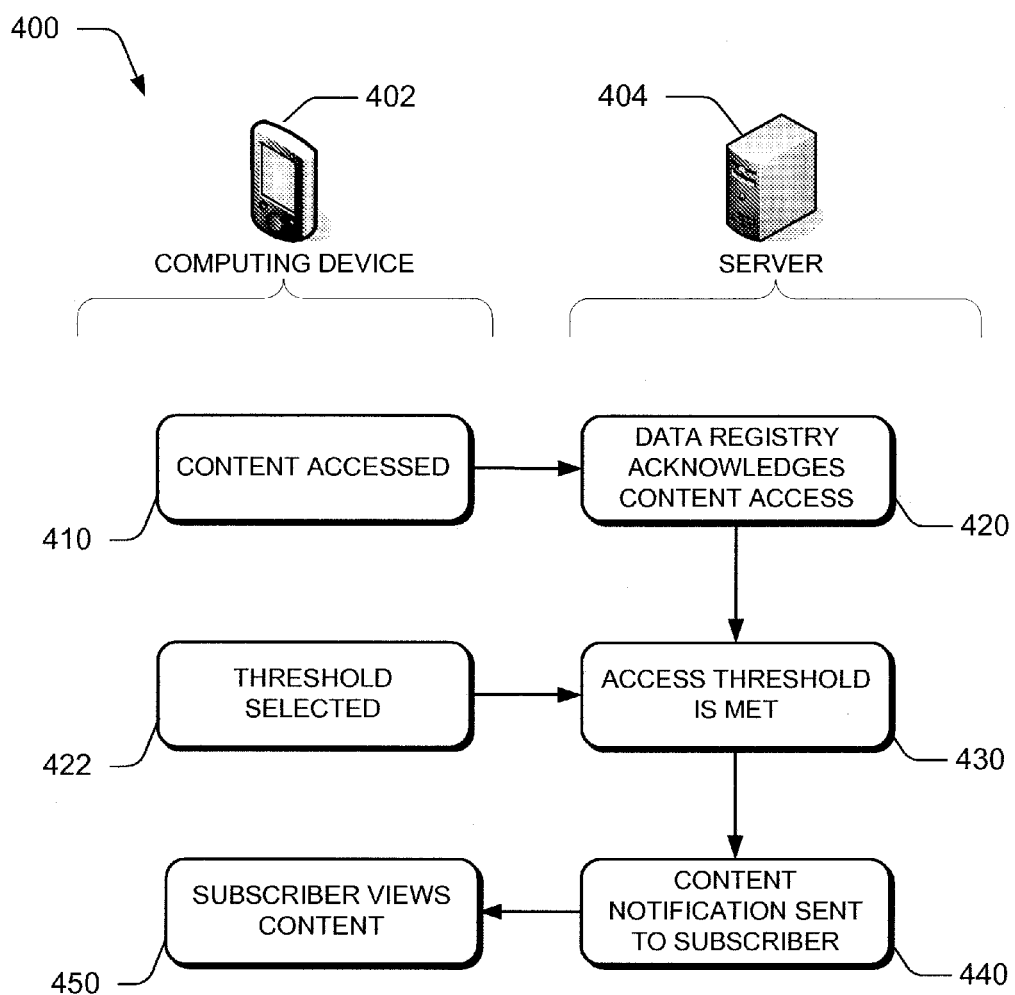
FIG. 4 is a flow chart of a method of providing group swarm metrics and content.

FIG. 4 illustrates a flow diagram of how the communication of users may be transmitted between a computing device 402 and a server 404. An environment 400 includes elements processed by the computing device 402 and by the server 404. However, the processing of these elements may not be exclusive to either the computing device 402 or the server 404 and thus may be alternatively configured in other embodiments. It should further be observed that the computing device 402 may represent a number of different computing devices, and the server 404 may represent a number of different servers. Additionally, the computing device 402 may pass information to other computing devices while the server 404 may pass information to other servers.

At block 410, content is accessed by the computing device 402. The content may be digital video, digital music, websites, or other digitally supported media. Additionally, convention forms of media, such as analog, that enable the compilation of digital information may be included in the content. For example, an analog television program may incorporate digital information when a portion of the viewing audience is involved in a telephone poll and the results are stored in a data storage device. At block 420, a data registry acknowledges that the content has been accessed by a user. The data registry continuously tracks the number of "views" (or "hits") that occur for a given piece of content in addition to other relevant information relating to the content. At block 430, an access threshold is met. The threshold may be met by comparing the threshold setting to the amount of content access for a particular piece of content. For example, the threshold value may be set at 100,000 viewings for a television program. When the data registry at block 420 records the 100,000th viewing, then block 430 determines that the access threshold has been satisfied.

In embodiments of the environment 400, a user who subscribes to a group metrics and content service as described herein may create or select the threshold value, at block 422, either on the computing device 402, or alternatively on the server 404. Additionally, a user may select threshold values created by other users, groups of users, system managers, and the like. Further, default values and system created threshold values may be created, such as values created by statistical information from the content data. Threshold values may be selected by a user from a list of threshold values incorporating a combination of the above methods of threshold creation.

With continued reference to FIG. 4, block 440 depicts a content notification sent to a subscriber. The content notification may be a digital message, and email, alert, text message, or the like. In one example, the notification sent is a message that includes a number of attributes about the content such as the number of views, location, summary, time, and link to content. Additionally, other information sufficient to inform a user and provide details of the content, interest in the content, and access to the content may be provided. At block 450, the subscriber loads the content described in the content notification. To expand upon the above example, the subscriber may select a link in the message and be automatically directed to the source of the content. Alternatively, the subscriber may read the message to learn more about the content notification.

Figure 5:
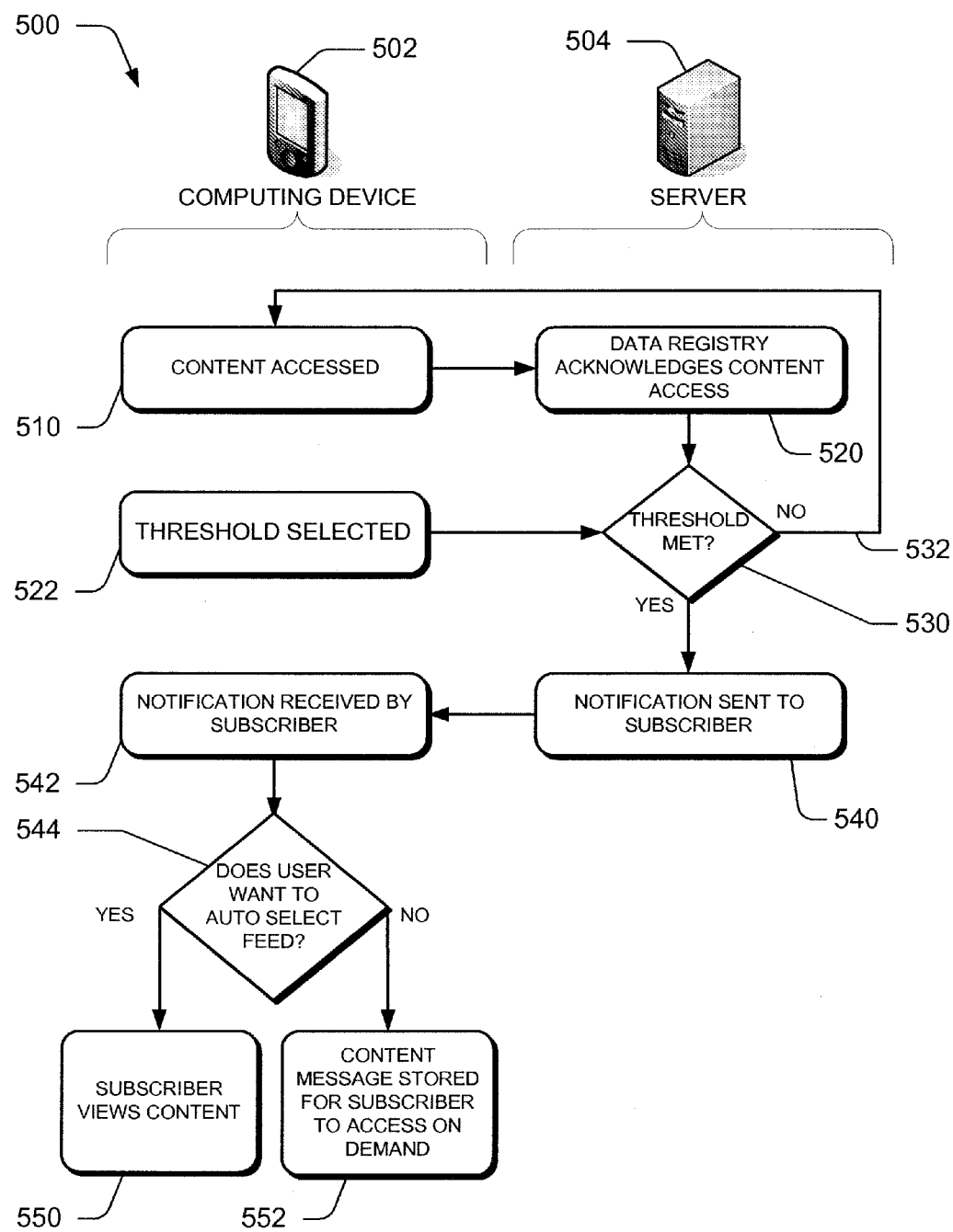
FIG. 5 is a flow chart of another method of providing group swarm metrics and content.

FIG. 5 illustrates alternative embodiments in an environment 500, including elements processed by either or both a computing device 502 or a server 504, although other configurations are contemplated. At block 510, content is accessed by the computing device 502. At block 520, the data registry acknowledges that the content has been accessed by a user. The data registry will compile the amount of "views" (or "hits") that occur for a given piece of content. At block 522, the threshold value is selected or created for the computing device 502. According to exemplary embodiments, the threshold value for a computing device, such as the computer device 502, may be stored on the computing device and/or associated with the computing device and stored on the server 504 or other system in communication with the computing device and/or the server. At block 530, the threshold value associated with the computing device 502 is compared to the number of views associated with a given piece of content. The threshold value may be compared to the number of views by the swarm metrics component of the computing device 502 and/or of the server 504. If the threshold value is not satisfied 532, then the environment remains idle until content is accessed again at block 510. If the threshold value is satisfied, then at block 540, a content notification is sent by the server 504 to the subscriber. At block 542, the notification is received by the subscriber.

At block 544, the environment determines if the subscriber selected auto feed of the content. For example, a subscriber may want the content to be automatically delivered to the subscriber without requiring action by the subscriber, as depicted at block 550. Alternatively at block 550, the subscriber may want the content uploaded on the computing device 502 in order to expedite viewing at a later time. To further expand this example, in a DVR application, the subscriber may want the DVR (i.e., computing device) to automatically switch to the popular video once the threshold value is satisfied, resulting in real-time viewing of the event. Alternatively, a subscriber may want the DVR to record a popular video once the threshold value is satisfied. If the subscriber does not select auto feed, at block 552, the content message may be stored for subscriber to access the content on demand. For example, in the above DVR example, a message may be displayed in conjunction with the currently viewed program and indicate that the threshold value has been met for a popular video. Alternatively, the message may be stored in an "inbox" or similar location for notification messages, allowing the subscriber to retrieve the message when the user is available or desires to retrieve it. In embodiments of the environment 500, the subscriber can connect to the content by accessing the content message at block 552.

Figure 6:
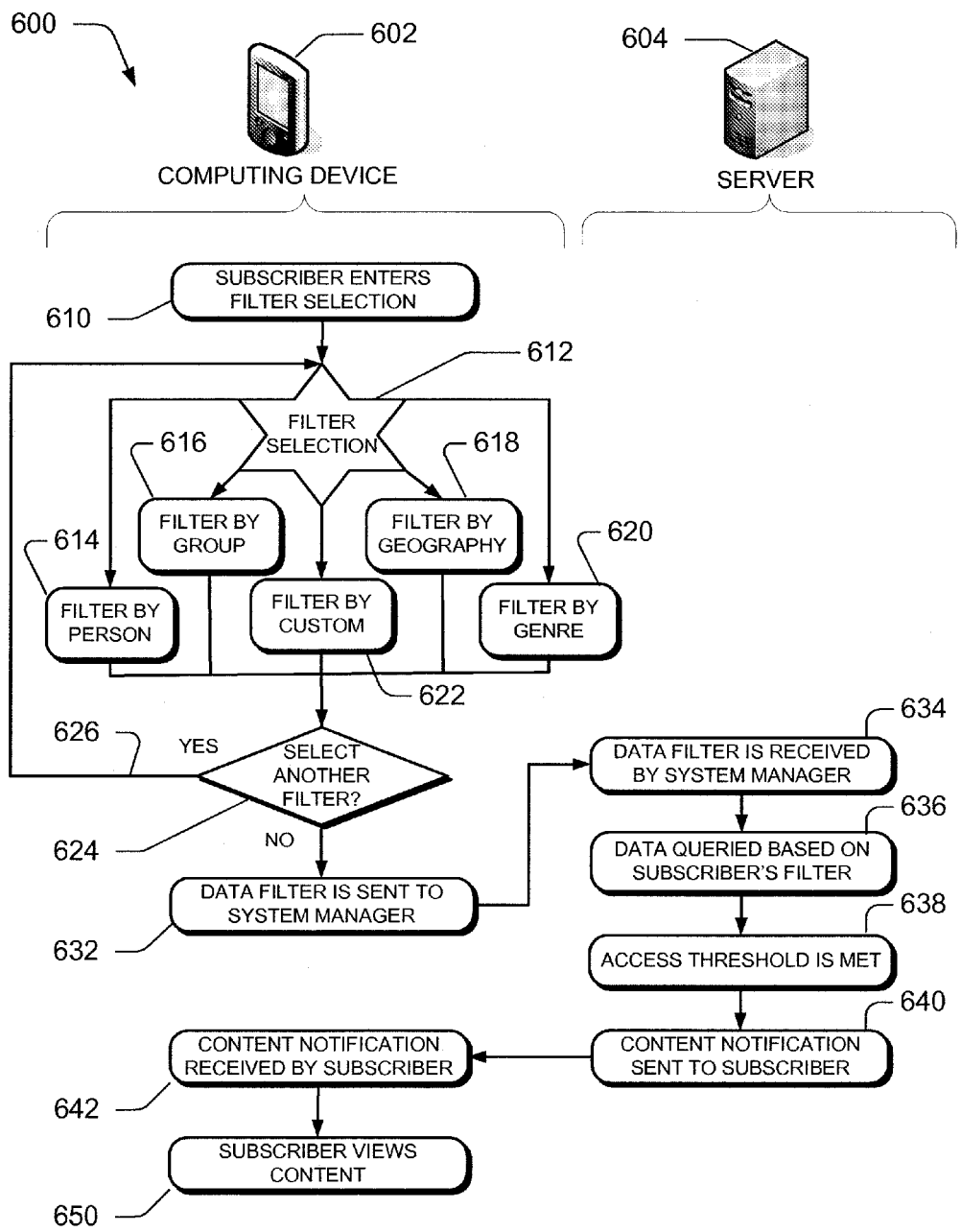
FIG. 6 is a flow chart of a method of selecting a filter for providing group swarm metrics and content.

FIG. 6 illustrates additional embodiments in an environment 600 regarding creating a filter, including elements processed by either or both a computing device 602 or a server 604, although other configurations are contemplated. At block 610, a subscriber enters a filter selection option using the computing device 602. Additionally, the user may create a filter on other devices such as a computer connected to a website for creating filters or the server 604. At block 612, a filter selection type is made by the subscriber. For example, the computing device 602 or the server 604 may have software which permits the subscriber to select a type of filter from a menu display.

In some embodiments, one or more of the following filters may be selectable by the subscriber: filter by person (block 614), filter by group (block 616), filter by geography (block 618), and filter by genre (block 620). In one example, a filter by person, block 614, may allow a subscriber to select an individual person, for example a friend or a famous person. In such a circumstance, this filter may facilitate monitoring of an individual's activities such that the subscriber would be notified when the selected person accesses given content. To further expand this example, a subscriber may be interested in what a friend is viewing. When the friend views some content, such as a website, then the subscriber may be notified of this content while other content is filtered out at block 614. As previously described, thresholds may also be set to permit a subscriber to further limit when notifications are sent to the subscriber regarding content viewing. Thus, in the example immediately above, a subscriber may only desire to receive a notification regarding friend's content access once the friend has accessed a particular website ten (10) times, or some other predetermined number of occurrences indicated in the threshold value.

In some embodiments, the filter by geography 618 may enable a user to select other users within a user-determined proximity to monitor other user's activities. For example, a user may desire to select other users that are attending a similar event, such as a football game. To select other users within the football game event, the user may filter by the event (e.g., the football game) or may filter by a set distance from the user, such as all users within 300 meters, thus capturing all the users attending the football game event.

In addition to the filters in blocks 614, 616, 618, and 620, other filters may be present and selectable by the subscriber. At block 622, a filter by custom may allow a subscriber to create a customized filter as desired by the subscriber. For example, the filter may allow the subscriber to create customized queries or write computer-readable code to create a filter. In some embodiments of the environment 600, a subscriber could create custom filters using queries which include operators such as greater than, greater than or equal, less than, less than or equal, equal, not equal, or the like. Additionally, Boolean operators such as AND, OR, and the like, may be used to create customized queries for a filter. Data elements capable of having a filter applied to them may also be selectable at block 622, allowing the above operators to be applied to different data elements such as number of views, characteristics of the viewing audience, time of viewing, and the like.

In further embodiments of the environment 600, users may be able to select users and filter terms utilizing the interrelationship of users and terms that may not have a hierarchical relationship with one anther. Interrelationships may include associations such as "is related to" and "also known as," however more interrelationships may exist and be utilized. In one example, a user may desire to select users who are associated with the user's buddies, thus expanding the user's community to people with a single common association with the user. In another example, a user may want to filter users by geography, such as users in Seattle, Wash. A possible interrelation with Seattle may be the Seattle/Tacoma metro region, thus expanding the community a user may desire to select.

At block 624, the subscriber may be permitted to select an additional filter, through route 626, to be performed with the one or more filters already created by the subscriber. It is contemplated that the subscriber may create two or more filters using the AND Boolean operator in some embodiments, and alternatively may use the OR Boolean operator, or other types of operators to create a desirable filter, or set of filters, for the subscriber. Alternatively, the subscriber may not desire to create or implement additional filters or to create any filters at all. Although not depicted in the environment 600, it is contemplated that a filter may also be disabled, removed, or replaced utilizing similar menus, functions, and architecture as described in the filter selection process of block 612.

At block 632, the data filter created in the environment 600 is sent to a system manager. A system manager may be in network connection with the subscriber's computing device 602 and a data storage device (see FIG. 1, element 150), or may be local on the computing device. Further, the system manager may perform functions and manipulations to data on the data storage device. The data filter is received by the system manager at block 634. At block 636, data in the storage device is queried based on the subscriber's filter. For example, the specific data requested by the subscriber, upon implementation of a filter, is searched for, or queried, by the system manager. At block 638, the access threshold is met. As discussed above regarding the filter selection and implementation, a threshold value may also be utilized in conjunction with a filter. By way of example, a subscriber may desire to receive a notification of all websites accessed in France that have to do with wine and have at least 1000 views. After the subscriber creates an appropriate filter through the filter selection process 612, all websites that meet the threshold value will be sent to the subscriber. Additionally, as new websites meet this threshold value while satisfying the filtering criteria, these new websites will also be sent to the subscriber.

With continued reference to FIG. 6, a notification is sent to the subscriber at block 640 and received by the subscriber at block 642. At block 650, the subscriber may load the content relating to the notification received at block 642.

Figure 7:
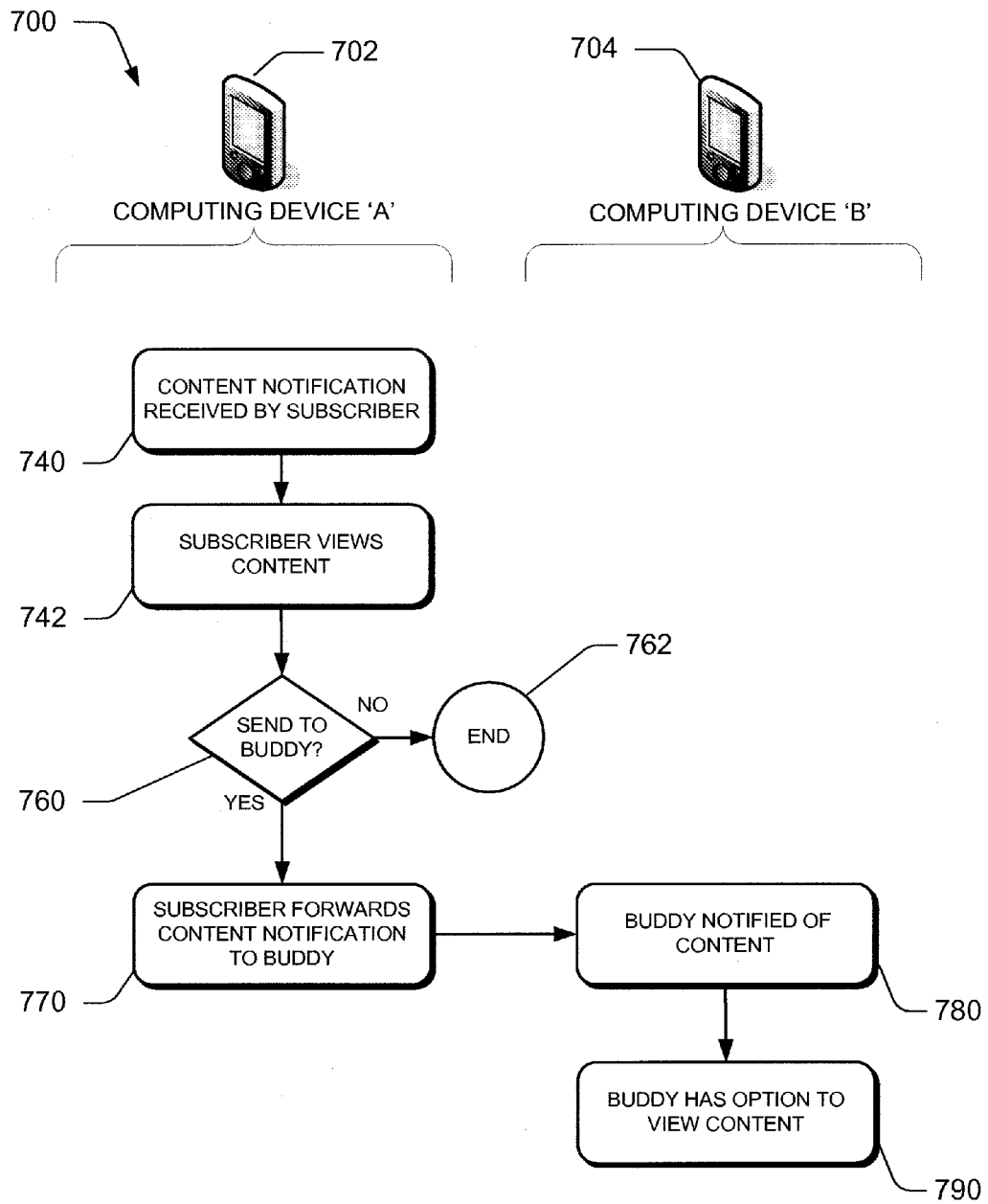
FIG. 7 is a flow chart of a method of distributing group swarm metrics and content.

FIG. 7 illustrates further embodiments of the system in an environment 700, including elements processed by computing devices 702, 704. At block 740, a content notification is sent to a subscriber through a network connection with the computing device 702. At block 742, the subscriber acknowledges the notification on the computing device. At block 760, the subscriber decides whether to send the notification to the computing device 704 of a buddy, or other person. The buddy may be a subscriber, a non-subscriber, a friend, relative, classmate, or the like. Further, the buddy may be a group or selection of groups of the above types. For example, a subscriber may receive a content notification 740 of a popular musical recording. The subscriber may acknowledge the notification by viewing the content, by reading a summary of the content, or by other means. If the subscriber does not send the notification to a buddy, no action occurs 762. However, the notification may be sent, or forwarded, to a buddy. At block 770, the subscriber sends or forwards the content notification to the buddy's computing device 704. In the above example, the notification of the musical recording may be forwarded to the buddy such that the entire notification received by the subscriber is viewable by the buddy. Alternatively, only parts of the notification received by the subscriber may be sent to the buddy. To provide further clarity, the original notification to the subscriber may include number of views, location, summary, time, and link to content. However, the message sent to the buddy may only include a portion of this information such as the link to the content and a summary of the content. In additional embodiments, the subscriber may attach a personalized message to the buddy and send it along with the notification.

At block 780, the buddy is notified of the content. At block 790, the buddy views the notification of the content. In some embodiments, the buddy may be provided access to the content link, and may further be able to access the content. Alternatively, it is contemplated that the buddy may not have access to the content but still may receive a notification regarding the content. For example, in a subscription based environment, the buddy may not have the required privileges to load the content. Alternatively, the buddy may be extended privileges to view the content through the notification. For example, the buddy may be permitted to load the content through the notification message a predetermined number of times. The number of permissible loads may be set by the subscriber, the service provider, or by other parties who control the access privileges of the content at issue.

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

Although techniques for providing a distribution scheme for subscriber-related content have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A non-transitory computer-readable storage medium storing instructions which, when executed by a processor, cause the processor to perform operations, the operations comprising:
compiling a content access metric, wherein the compiling the content access metric comprises measuring a number of users in a group accessing a content during a period of time, wherein the group comprises a plurality of users physically present within a specific geographic constraint during the period of time;
determining a threshold metric for a user;
generating a notification message for the user when the content access metric reaches the threshold metric; and
delivering the notification message to the user.

2. The non-transitory computer-readable storage medium of claim 1, wherein the generating the notification message comprises:
querying the content access metric based on a plurality of user selected filter criteria; and
enabling the user to retrieve the content.

3. The non-transitory computer-readable storage medium of claim 2, wherein the plurality of user selected filter criteria includes filtering by a genre.

4. The non-transitory computer-readable storage medium of claim 2, wherein the plurality of user selected filter criteria includes an interrelationship between another user and the plurality of user selected filter criteria.

5. The non-transitory computer-readable storage medium of claim 2, wherein the enabling the user to retrieve the content further includes enabling the user to forward the notification message to another user within the group.

6. The non-transitory computer-readable storage medium of claim 1, wherein the notification message for the user includes a portion of the content access metric.

7. The non-transitory computer-readable storage medium of claim 1, wherein the determining the threshold metric for the user includes receiving a user generated value from the user.

8. The non-transitory computer-readable storage medium of claim 1, wherein the compiling the content access metric includes communications occurring within an environment of the user.

9. The non-transitory computer-readable storage medium of claim 1, wherein the compiling the content access metric and delivering the notification message to the user result in providing a real time alert to the user.

10. A non-transitory computer-readable storage medium storing instructions which, when executed by a processor, cause the processor to perform operations, the operations comprising:
creating content access information, wherein the creating the content access information comprises measuring a number of users in a group accessing a content during a period of time, wherein the group comprises a plurality of users physically present within a specific geographic constraint during the period of time;
sending the content access information to an aggregating component;
receiving a content notification message from the aggregating component when a threshold value of the content access information is met for a user; and
displaying the content notification message to the user.

11. The non-transitory computer-readable storage medium of claim 10, wherein the creating content access information includes selecting a filter to modify compiled content access metrics based on a plurality of user selected filter criteria.

12. The non-transitory computer-readable storage medium of claim 11, wherein the plurality of user selected filter criteria includes filtering by a genre.

13. The non-transitory computer-readable storage medium of claim 10, wherein the creating content access information includes selecting a threshold value.

14. The non-transitory computer-readable storage medium of claim 10, further comprising:
enabling the user to retrieve the content; and
enabling the user to forward the content notification message to another person within the group.

15. The non-transitory computer-readable storage medium of claim 14, wherein the selecting the threshold value for a user includes receiving a user generated value from the user.

16. The non-transitory computer-readable storage medium of claim 10, wherein the displaying the content notification message to the user includes retrieving the content for the user.

17. The non-transitory computer-readable storage medium of claim 10, wherein the creating content access information includes communications occurring within an environment of the user.

18. A non-transitory computer-readable storage medium storing instructions which, when executed by a processor, cause the processor to perform operations, the operations comprising:
   creating content access information, wherein the content access information includes a threshold value;
   compiling content access metrics, wherein the compiling content access metrics comprises measuring a number of users within a group accessing a content during a period of time, wherein the group comprises a plurality of users physically present within a specific geographic constraint during the period of time;
   determining when the content access metrics reach the threshold value;
   creating a notification message for a user, wherein the notification message includes a portion of the content access metrics; and
   delivering the notification message to the user.

19. The non-transitory computer-readable storage medium of claim 18, wherein the content access information is from the group.

* * * * *